United States Patent [19]
Beatenbough et al.

[11] 3,731,729
[45] May 8, 1973

[54] SELECTOR/PROGRAMMER ASSEMBLY FOR AUTOMATIC TEMPERATURE CONTROL

[75] Inventors: Paul K. Beatenbough, Medina; Lewis E. Dresch, North Tonawanda; Ward H. Hutchins, Lockport; Walter W. Weiss, Tonawanda, all of N.Y.

[73] Assignee: General Motors Corporation, Detroit, Mich.

[22] Filed: Feb. 7, 1972

[21] Appl. No.: 223,904

[52] U.S. Cl. ................165/16, 137/625.21, 165/42, 237/2 A, 237/12.3 A
[51] Int. Cl. ................................................B60h 1/02
[58] Field of Search ................237/2 A, 12.3 A; 137/625.21; 165/42, 16

[56] References Cited

UNITED STATES PATENTS

| | | | |
|---|---|---|---|
| 3,082,955 | 3/1963 | Obermaier | 237/2 A |
| 3,263,739 | 8/1966 | Gaskill et al. | 165/28 X |
| 3,284,589 | 11/1966 | Golden et al. | 137/625.21 |

Primary Examiner—William F. O'Dea
Assistant Examiner—Peter D. Ferguson
Attorney—W. S. Pettigrew et al.

[57] ABSTRACT

An automatic temperature control system for heating and cooling an automobile passenger compartment including temperature responsive means for positioning a heat regulating member, damper means in passages for directing air into the passenger compartment through alternate outlets, vacuum motors for moving said dampers between operative positions and an integral vacuum selector assembly for routing vacuum pressure to the vacuum motors. The vacuum selector assembly includes valves mounted upon a multilayered member formed of parallel plates fastened to one another and having vacuum passages therebetween formed by channels in the plates which are alternately interconnected in response to rotation of the vacuum selector valve. A multi-speed blower is controlled by several switches mounted upon a base which is spaced from the adjacent plates. Small vacuum actuators formed on one of the plates operate the electric switches to effect changes in the blower speed in response to rotation of the selector valves.

4 Claims, 9 Drawing Figures

Patented May 8, 1973

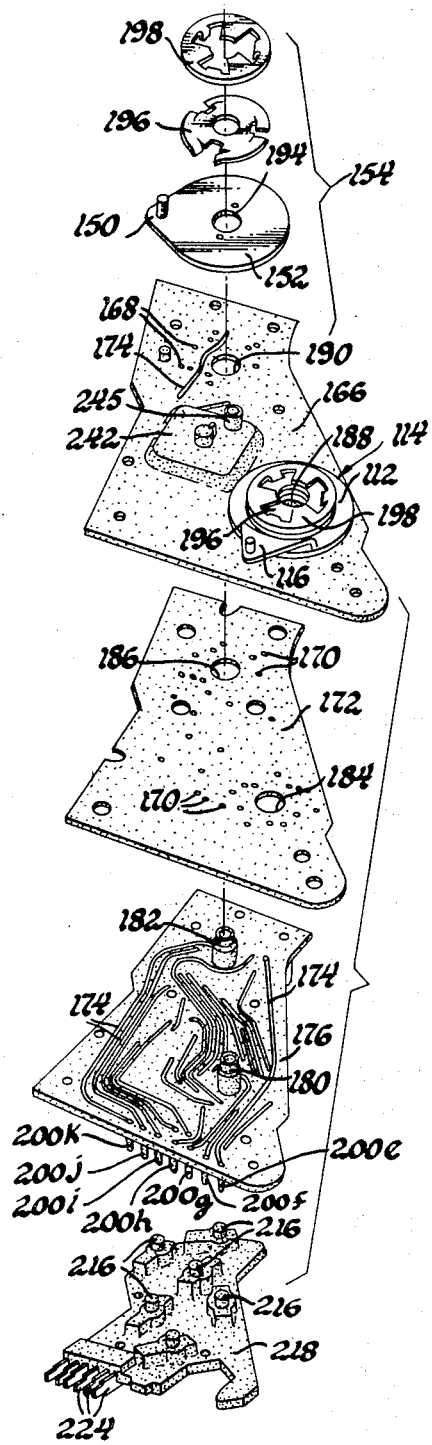
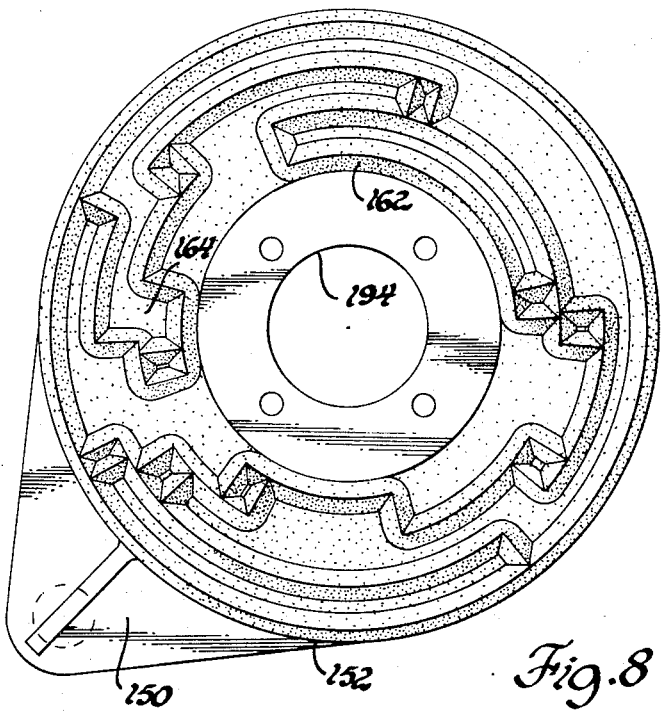
Fig.8
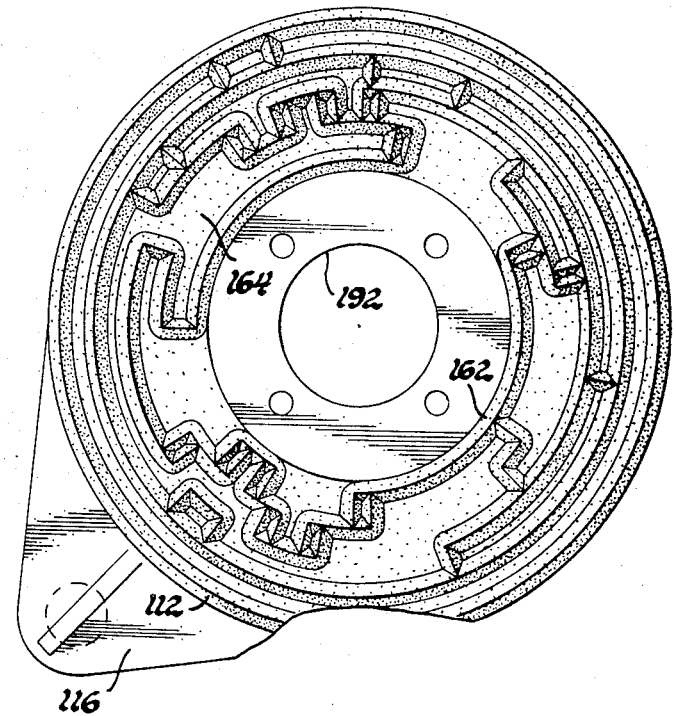
Fig.7
Fig.9

SELECTOR/PROGRAMMER ASSEMBLY FOR AUTOMATIC TEMPERATURE CONTROL

This invention is directed to automatic temperature control systems for automobiles and particularly to an integral vacuum programming assembly.

Automatic temperature control systems presently in use for automobiles utilize a number of vacuum and electrical components connected together by electrical wiring and vacuum hoses. This type of automatic control system is disclosed in U.S. Pat. No. 3,263,739 to Gaskill et al., issued Aug. 2, 1966. The Gaskill system utilizes a rotary type vacuum selector valve pivoted in response to movement of a lever extending through a slot in the automobile dashboard. The valve is connected by vacuum hoses to a second rotary type vacuum valve. The second valve operates in response to movement of a connected vacuum motor which is also connected to a heat regulating member such as a damper. The dash control enables the selection of the following system mode functions: OFF, AUTO, VENT, DE-FOG and DE-ICE.

A disadvantage of the Gaskill system is the many vacuum and electrical connections between the separate components which are located apart from one another. These vacuum hoses which are used to interconnect the components are subjected to air leakage which prevents the system from operating as designed. Also, the hoses and electric connections between the components are costly and present assembly problems.

The present automatic temperature control system includes an integrated vacuum and electrical programming assembly. Many hose connections and electrical connections are eliminated. Basically, the assembly uses two rotary type vacuum selector valves which are pivotally mounted against a flat plate. This plate is secured to other plates which extend parallel to one another to form a multilayered member. Vacuum passages which connect the two selector valves are formed between adjacent plates by grooves or channels. Ports in the other plates connect the channels and the selector valves. The valves are rotated to alternately interconnect the different passages formed by the channels. This routes vacuum pressure to outlet fittings and hence through hoses to various vacuum motors for pivoting air doors to effect a vent, defrost, defog, heat or cool mode of operation.

In addition, small vacuum actuators supported on one of the plates are connected to a vacuum pressure source by the selector valves. These vacuum actuators operate electrical switches which are supported on an adjacent circuit board. The electrical switches energize various system components such as an electromagnetic clutch of the air conditioning compressor, an electromagnetic solenoid valve for opening the inlet to vacuum pressure and resistors in a blower motor circuit for varying blower speed. The electrical connections are made in response to vacuum pressure which is directed to the actuators by the selector valves. Many electrical connections and wires which previously extended between a dashboard control and a remote circuit board are eliminated. Only a mechanical connection such as made by a Bowden type wire, is used to operate the selector valves.

In addition to the aforementioned advantages of an integral control assembly, the particular vacuum selector valves disclosed are an improvement over those disclosed in the Gaskill patent. The Gaskill type vacuum valves utilize die cast rotors and stators which had to be finely machined and matched to prevent air leakage as the rotor pivoted. The present vacuum valve has rubber faced rotors which rotate against a flat plate of the control assembly. The inherent compressibility of the rubber allows the rotor to be used after molding without additional finishing. Also, dirt contamination and clogging are less of a problem with the rubber faced rotors than with die cast rotors.

An advantage of the integral programming assembly is the use of vacuum valves to directly control all system functions (both electrical and vacuum). Separately activated vacuum and electrical assemblies previously used must be adjusted to ensure proper synchronization. This operation is eliminated by using selector valves to control both vacuum and electrical functions.

Further objects and advantages of the present invention will be more readily apparent from the following detailed description, reference being had to the accompanying drawings in which a preferred embodiment of the invention is clearly shown.

IN THE DRAWINGS

FIG. 7 is an assembly view of the integral programming assembly looking in the other direction;

FIG. 8 is an enlarged view of one of the rubber faced rotors; and

FIG. 9 is an enlarged view of the other rubber faced rotor.

Figures 1, 2:
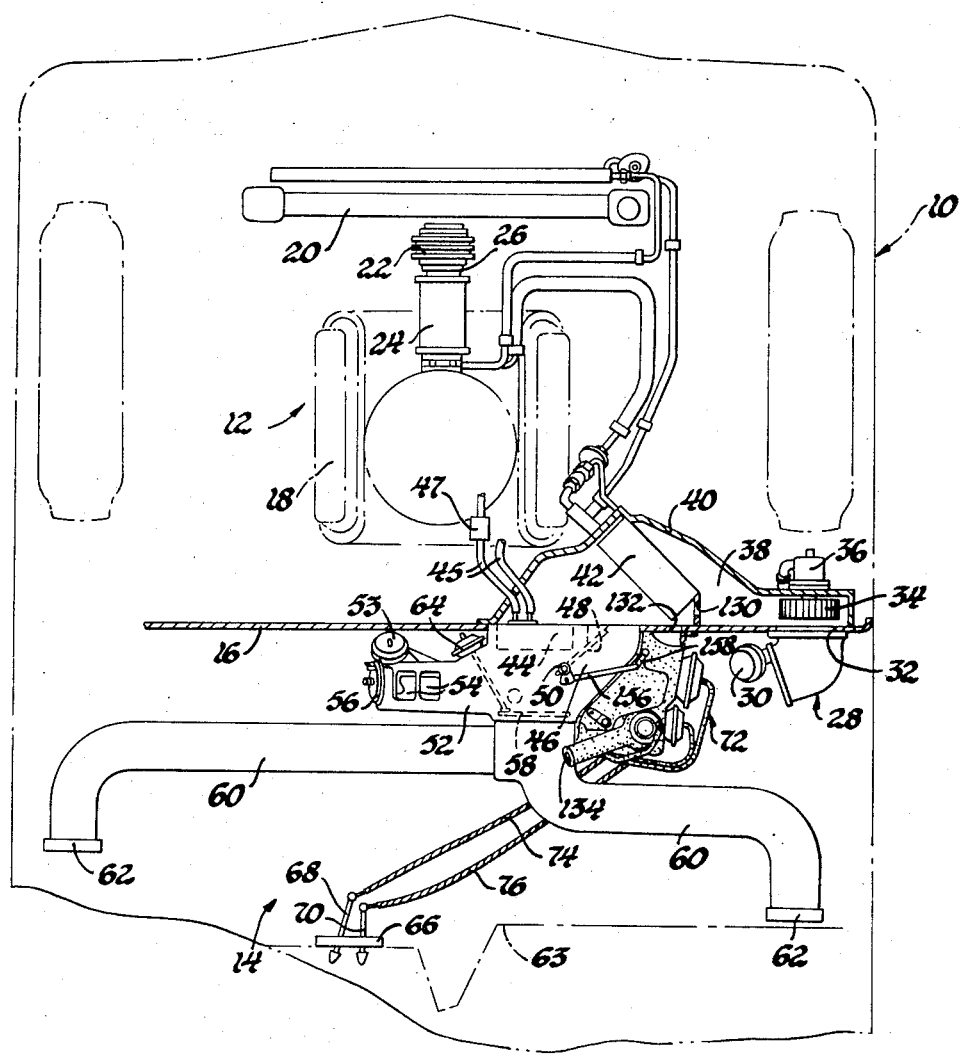
FIG. 1 is a horizontal sectioned view of the forward portion of an automobile showing the present automatic temperature control system.
FIG. 2 is an enlarged vertical view of an integral control assembly which is part of the system shown in FIG. 1.

The forward portion of an automobile 10 is illustrated in FIG. 1. Automobile 10 includes an engine compartment 12 and a passenger compartment 14 separated by a firewall 16. An internal combustion engine 18 is supported within the engine compartment 12 and is cooled by a radiator 20. The crankshaft of engine 18 is connected by a belt to a pulley 22 of an air conditioning compressor 24. An electromagnetic clutch mechanism 26 connects the pulley 22 with the shaft of compressor 24 for operating the compressor.

The heating and air conditioning system of automobile 10 includes an air inlet assembly 28 having an opening to the passenger compartment 14 and an opening to atmosphere for either drawing all its air from the passenger compartment 14 or drawing a combination of passenger compartment air and outside air into the heating and air conditioning system. An air inlet door (not visible) is moved by a vacuum motor 30 to effect the two modes of operation described above. Air is drawn through opening 32 in firewall 16 by a blower 34 driven by an electric motor 36. Air flows from the blower 34 through a plenum chamber 38 formed by a duct member 40. The air flows through an evaporator core 42 for cooling and dehumidifying. The air then flows either through a heater core or through a bypass 46 around the heater 44. The heater 44 is warmed by engine coolant flowing through hoses 45 and controlled by a vacuum operated valve 47. An air mix door 48 is pivoted about axis 50 to divide air flow through heater core 44 and bypass 46 in various proportions.

The air enters the passenger compartment 14 through one or more openings in an air distribution duct 52. When in an automatic mode of operation with warmer temperature selected than in passenger compartment 14, air is discharged into the passenger compartment through a heater outlet in the bottom of the air distribution duct 52. A vacuum motor 53 opens and closes the heater outlet to control air flow. When a defog or defrost mode of operation is selected, the air is discharged through openings 54 which are connected by hoses to the base of the windshield for discharge against its inner surface. A two position vacuum motor 56 pivots a defrost door to direct either a small quantity of air or a larger quantity of air through openings 54 corresponding to either a de-fog or a de-ice mode of operation. When in an automatic mode of operation with a lower temperature desired than is in the passenger compartment 14, a mode door 58 is moved to direct air into an upper level distribution duct including air hoses 60 and outlets 62 in the dashboard 63 of the automobile. The mode door 58 is pivoted between operative positions by a vacuum motor 64.

The aforedescribed function modes of the system are manually selected by movement of a control 66 on the dashboard 63 of the automobile. The control 66 includes a mode selector lever 68 and a temperature selector lever 70. Movement of the levers is transmitted to the selector and programmer assembly 72 by means of Bowden wires 74 and 76.

The mode selector lever 68 is moved between the different functional mode settings as follows: OFF, VENT, AUTOMATIC, DE-FOG and DE-ICE. In the off position, no vacuum pressure is applied to the motors 30, 53, 56, 64. In the vent position, vacuum pressure is directed to motor 30 for permitting outside air to enter the passenger compartment. In the de-ice, and de-fog positions, vacuum pressure is applied to the motor 56 to cause a flow of warm air against the windshield. In the automatic position, vacuum pressure is selectively applied to motors 30, 53, 56, 64 in response to movement of a programmer vacuum valve and a selector vacuum valve which are shown in FIGS. 7 – 9 and will be later discussed in more detail.

Figure 3:
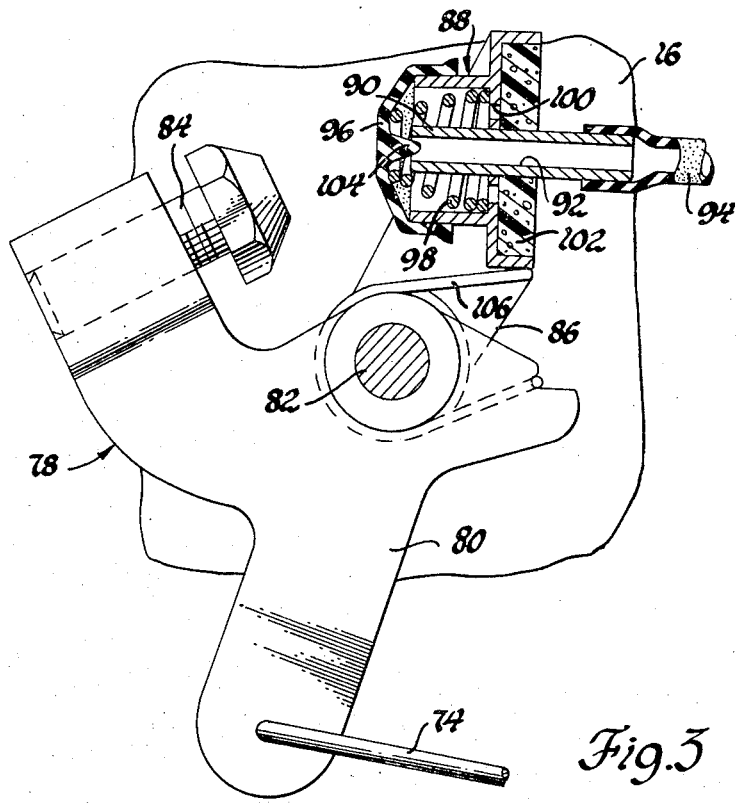
FIG. 3 is an enlarged view of one portion of the control assembly shown in FIG. 2.

Referring to FIGS. 1 and 3, Bowden wire 74 extends between lever 68 and a vacuum regulator 78. The vacuum regulator includes a positioner lever 80 which is pivotally mounted upon a shaft 82. On one arm of the positioner lever, an adjustable member 84 is supported. A vacuum regulator lever 86 is independently pivoted about shaft 82 and supports an air bleed valve assembly 88. The air bleed valve 88 includes an inlet 90 defining an air bleed passage 92 for permitting air at atmospheric pressure to leak into a vacuum hose 94 in a controlled manner. A cup-shaped diaphragm 96 overlays the inlet 90 but is normally spaced therefrom by a coil spring 98. Air inlet ports 100 transmit atmospheric air to the bleed passage 92 through a filter 102 which prevents foreign matter from entering. A central portion 104 of diaphragm 96 is adapted to extend into inlet 90 to control the admission of air. The positioner lever 80 is pivoted with respect to the lever 86 to cause the adjustable head 84 to engage diaphragm 96. This opens and closes passage 92. The relative angular relation between levers 80 and 86 is maintained by a torsion type spring 106 around the shaft 82.

The modulated vacuum pressure produced by bleed valve 88 is transmitted to vacuum motor 108 shown in FIG. 2. The vacuum motor 108 has a sealed enclosure formed by a housing and a flexible diaphragm. The diaphragm is normally biased into a position maximizing the volume of the enclosure by a spring but is movable against the spring in response to vacuum pressure introduced into the enclosure. The diaphragm of vacuum motor 108 is connected by an arm 110 to a lever 116 which is attached to the rotor 112 of vacuum selector valve 114. Vacuum pressure generated by the air bleed valve assembly 88 causes the vacuum motor 108 to rotate rotor 112. This rotor 112 selectively directs vacuum pressure to the vacuum motors 30, 56, 64 and 57.

Figure 4:
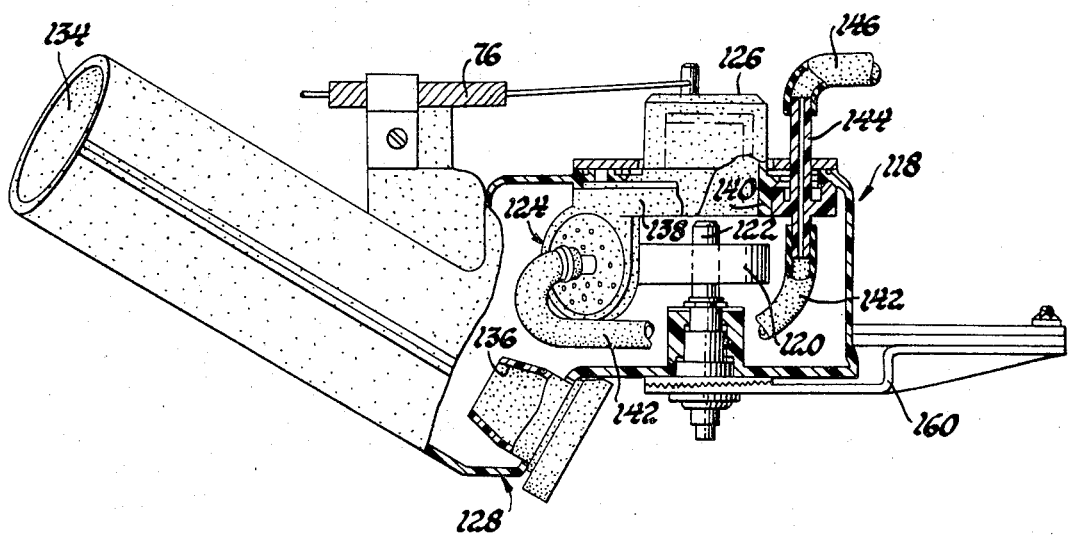
FIG. 4 is an enlarged view of a second portion of the control assembly shown in FIG. 2.

The temperature of air introduced to the passenger compartment is selected by pivotal movement of the dashboard lever 70 in the control assembly 66. Movement of lever 70 is transmitted by Bowden wire 76 to a vacuum regulating assembly 118 shown in FIGS. 2 and 4. The assembly 118 includes a spirally wound bimetal member 120 supported at its central end by a shaft 122. The other end of the bimetal element which is located at the periphery of the spiral bimetal moves in a circular path with temperature changes. The peripheral end engages an air bleed valve assembly 124 similar to the air bleed valve assembly 88 shown in FIG. 3. Air is drawn through an inlet 126 from the passenger compartment and over the bimetal 120 by an aspirator portion 128. The aspirator 128 includes ports 130 and 132 shown in FIG. 1 for conducting air from the blower 34, over the bimetal 120 and into the passenger compartment through outlet 134. A converging nozzle portion 136 causes a decrease in the pressure of the air in the vicinity of outlet 134 and thereby draws air through the regulator assembly 118.

The air bleed valve assembly 124 is supported upon a collar portion 138 which is rotatable about a wall 140 which forms an air inlet. The air bleed valve assembly 124 has an air bleed passage connected by a vacuum hose 142 to fitting 144 extending through the end of the assembly 118. The other end of fitting 144 is connected to a vacuum hose 146 to transmit vacuum pressure developed by the air bleed valve assembly to a vacuum motor 148. Vacuum motor 148 is similar to the motor 108 and includes a housing and diaphragm which form an enclosure therebetween. The vacuum motor 148 is connected to rotor 152 which forms part of a vacuum programmer selector valve 154. The rotor 152 of selector valve 154 is best shown in FIGS. 7 and 8. Rotational movement of rotor 152 by the vacuum motor 148 also pivots the air mix door 48 to produce a preselected temperature by means of an arm 156 and crank 158 which connect the air mix door 48 with rotor 152.

When lever 70 on the dashboard is set at a new temperature, Bowden wire 76 moves the air bleed valve assembly 124 with respect to the bimetal 120. Coaction between the peripheral end of the bimetal and the air bleed valve causes the vacuum operated motor 148 to rotate the programmer valve 154 to a new angular position corresponding to the aforementioned setting of the control assembly. A linkage 159 (see FIG. 2) between rotor 152 of programmer valve 154 and a lever 160 which is attached to the shaft 122 repositions the bimetal 120 in correspondence with a new position of the rotor 152. As the temperature in the passenger compartment changes, the interaction between the bimetal end 120 and the diaphragm of the air bleed valve produces a vacuum pressure which causes movement of the rotor 152 and the air mix door 58.

Figures 5, 6:
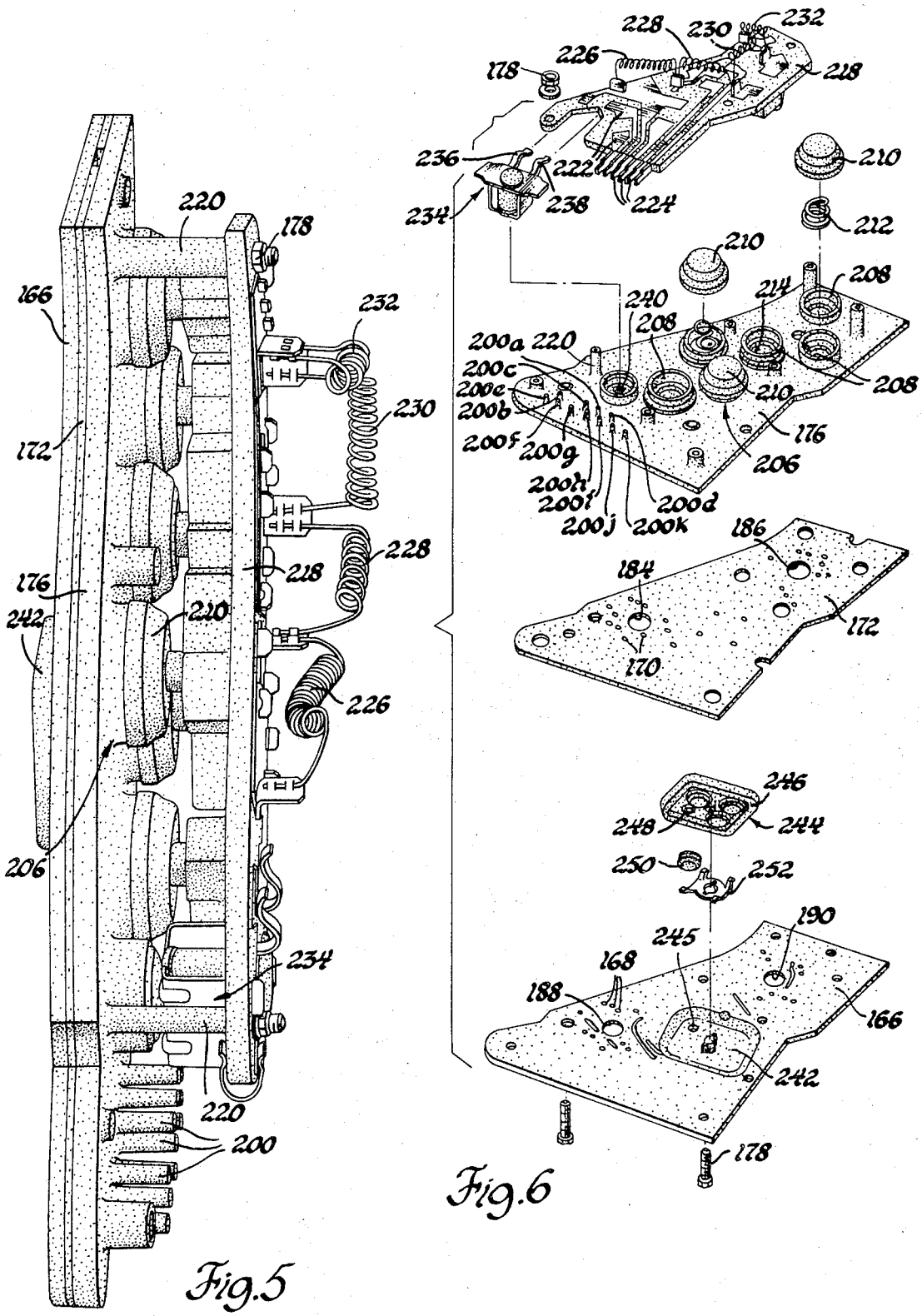
FIG. 5 is an enlarged view of the assembled integral programming control assembly.
FIG. 6 is an assembly view of the integral programming assembly looking in one direction.

The rotors 112 and 152 comprise metal disk bases with rubber faces molded on one side. The rubber mold forms a number of ridges 162 which define channels 164. This rubber face is adapted to contact the surface of the plate 166 as shown in FIGS. 6 and 7. A number of ports 168 which extend through the plate 166 are aligned with similar ports 170 in an adjacent plate 172. The ports 170 intersect channels or grooves 174 in one face of an adjacent plate 176. The plates 166, 172 and 176 are clamped together by screw and nut fasteners 178 (see FIG. 6). Two cylindrical bosses 180 and 182 project from plate 176, through bores 184 and 186 in plate 172 and bores 188 and 190 in plate 166. The rotors 112 and 152 with central bores 192 and 194 are adapted to receive the ends of bosses 180 and 182. The rubber faces of rotors 112 and 152 are pressed against plate 166 by leaf spring 196 and retainer 198 which are supported on the bosses 180 and 182. As the rotors 112 and 152 pivot with respect to plate 166, the ports 168 in plate 166 are interconnected by the channels 164 on the rotors. This connects the various channels 174 in the plate 176.

A raw vacuum inlet 199 on a check valve assembly 244 shown in FIG. 6, supplies the vacuum pressure for all the vacuum motors 30, 53, 56, 64, 108 and 148 and the vacuum water valve 47. Vacuum outlet nipples 200a – 200k which are formed on plate 176 are connected to various channels 174 to direct vacuum pressure to the aforementioned vacuum motors and water valve. Specifically, hoses 94 and 146 extend between outlets 200a and 200b and the selector vacuum regulator 78 and the temperature responsive vacuum regulator 118. Hoses 202 and 204 extend between outlets 200c and 200d and the program vacuum motor 148 and the selector vacuum motor 108. Outlets 200e – 200k are connected by hoses (not shown) to the water valve 47, the air inlet motor 30, the mode door motor 64, the heater door motor 53, the defroster door and bleed motor 56 and a purge door motor (not visible in FIG. 1) for permitting a flow of air continuously through the plenum chamber 38.

The rotors 112 and 152 direct vacuum pressure to a number of vacuum actuators 206 on plate 176. The actuators include annular walls 208 which are integrally molded in plate 176 and cup-shaped diaphragms 210 which together form an enclosure therebetween. Coil springs 212 between the diaphragm 210 and the plate 176 normally space the diaphragm 210 away from the plate 176 when vacuum pressure is interconnected to the enclosure. Small ports 214 extend from the enclosure through the plate 176 to the channels 174. The rotors 112 and 152 route vacuum pressure to the small vacuum actuators through the ports 214.

The actuator diaphragms 210 engage a number of electrical switch buttons 216 supported by an electrical circuit board 218. The circuit board 218 extends parallel to plate 176 but is spaced therefrom by a number of legs 220. The circuit board 218 may be molded of non-conductive plastic material with a number of individual conductive bars 222. Bars 222 and switches 216 replace individual wires and connectors used in prior assemblies. The bars 222 extend from the end of circuit board 218 to form terminals 224 which are adapted to be connected to electrical components of the system (for instance the electromagnetic clutch 26 of compressor 24). A number of resistors 226, 228, 230 and 232 connect between the terminals of switches 216 to provide a means to vary the resistance in a circuit energizing the blower motor 36. This provides a speed range for the blower 34.

In FIG. 6, an electromagnetic solenoid valve 234 is shown having a magnetic core connected by terminals 236 and 238 to different bus bars 222. The solenoid valve 234 has a movable valve element extending through the core which is adapted to open and close a master vacuum passage 240 in the plate 176. When the valve 234 is deactivated, the valve element blocks the passage of vacuum pressure to the rotors 112, 152. When the solenoid valve is energized, the master passage 240 is opened to permit the transmittal of vacuum pressure to rotors 112 and 152 and hence through the channels 174 to the vacuum motors and vacuum actuators of the system.

FIG. 6 shows a check valve assembly 244 which is supported within a cavity 242 of plate 166. Vacuum pressure is transmitted from the intake manifold of an internal combustion engine to the check valve assembly 244. The base 246 of the assembly includes ports 248 for transmitting vacuum pressure to rotors 112 and 152 through the ports 170 and grooves 174. Flexible valve members 250 which extend over the ports 248 are normally pressed against the ports by a spring member 252. When sufficient vacuum pressure is introduced through the inlet 245, the valve members 250 are moved away from ports 248 against the force of the spring assembly 252. This transmits vacuum pressure to the rotors 112 and 152 through channels 174. If the vacuum pressure suddenly fails or drops significantly, the valve members 250 block ports 248 to prevent the sudden loss of vacuum pressure from channels 174 and 164 and thus maintain the system in an existing functional mode.

While the embodiment shown in the drawings and described above is the preferred embodiment, other embodiments might be adapted.

We claim:

1. An automatic temperature control system for heating and cooling an automobile passenger compartment comprising: a plurality of vacuum operated motors operably connected to air doors for transmitting air from said passenger compartment, through heating and cooling means and selectively to different outlets opening into the passenger compartment; means including a pivotal air mix door which proportions air flow between a heater and a bypass around the heater for regulating the temperature of air introduced into the passenger compartment; air blower means driven by an electric motor which is adapted to be operated at different speeds for varying the quantity of air flowing into said passenger compartment; an integral vacuum pressure and electrical switching assembly for alternately applying vacuum pressure to said vacuum motors to effect a predetermined air flow into said passenger compartment; said switching assembly also adapted to selectively apply vacuum pressure to vacuum actuators which operate electrical switches for varying the rotational speed of said blower motor; said assembly including a plurality of adjacent plates lying parallel to one another; passages formed between said plates by channels in said plates for transmitting vacuum pressure; a first vacuum switch including a rotor with a grooved face adapted to engage the surface of one of said plates for alternately interconnecting said channel passages as said rotor is rotated against said plate; a second vacuum switch including a rotor with a grooved face adapted to engage the surface of one of said plates for alternately interconnecting said channel passages as said rotor is rotated against said plate; said first and second vacuum switches being coactive with said channels to selectively direct vacuum pressure to said vacuum motors and vacuum actuators for effecting desired air flow into said passenger compartment and for producing a predetermined blower speed; an arm operatively connecting said second rotor to said air mix door for pivoting said door into its operative positions as said second rotor is rotated; means responsive to the temperature of air in the passenger compartment including a bimetal member and an air bleed valve coactive to generate a variable vacuum pressure in one of said vacuum motors which rotates said second rotor and said connected air mix door; a vacuum pressure regulating valve remotely moved manually from the passenger compartment for generating a variable vacuum pressure in another of said vacuum motors to effect rotation of said first rotor in response to movement of a control member.

2. An automatic temperature control system for heating and cooling an automobile passenger compartment comprising: a plurality of vacuum operated motors operably connected to air doors for transmitting air from said passenger compartment, through heating and cooling means and selectively to different outlets opening into the passenger compartment; means including a pivotal air mix door which proportions air flow between a heater and a bypass around the heater for regulating the temperature of air introduced into the passenger compartment; means responsive to the temperature of air in said passenger compartment for positioning said air mix door to effect a preselected air temperature; air blower means driven by an electric motor which is adapted to be operated at different speeds for varying the quantity of air flowing into said passenger compartment; an integral vacuum pressure and electrical switching assembly for alternately applying vacuum pressure to said vacuum motors to effect a predetermined air flow into said passenger compartment; said switching assembly also adapted to selectively apply vacuum pressure to vacuum actuators which operate electrical switches in an adjacent circuit board for varying the rotational speed of said blower motor; said assembly including a plurality of adjacent plates lying parallel to one another; passages formed between said plates by channels in said plates for transmitting vacuum pressure ports through said plates for interconnecting said channels with the surface of one of said plates; vacuum switches including rotors having grooved faces adapted to engage said surface of said one plate for interconnecting said ports and channels as said rotors are rotated against said one plate; said vacuum switches coacting with said channels to selectively direct vacuum pressure to said vacuum motors and vacuum actuators for effecting desired air flow into said passenger compartment and for producing a predetermined blower speed; an arm connecting one of said rotors and said air mix door for pivoting said door into its operative positions as said rotor is rotated.

3. In an automatic temperature control system for heating and cooling an automobile passenger compartment of the type having vacuum operated motors for positioning air doors and a variable speed electric motor driven blower for passing air through heating and cooling means, a vacuum and electrical switching assembly comprising: a plurality of flat plates extending parallel to one another and fastened together to form a multilayer member; channels in said plates and between adjacent plates which form vacuum pressure transmitting passages therebetween; a source of vacuum pressure connected to said channels; a rotary type vacuum switch including a disc shaped rotor with an end surface adapted to engage and be rotated against a surface of said multilayered member; said disc shaped rotor formed from a cylindrical metal base with elastomeric material molded on its end surface in the form of semi-annular channels for transmitting vacuum pressure as said rotor is pivoted against the surface of said multilayered member; ports in said multilayered member extending between said channels and said end surface of said multilayered member; said rotor end surface having channels formed therein for interconnecting said ports as said rotor is pivoted against said multilayered member; vacuum actuators formed on said multilayered member by annular walls extending normal to its surface and covered by flexible diaphragms which with the annular walls define an enclosure; ports in said multilayered member extending between said actuator enclosures and said rotor end surface for conveying vacuum pressure thereto in response to rotation of said rotor; an electrical circuit board supported parallel to said multilayered member and spaced therefrom including a plurality of electrical switches with portions adjacent said actuator diaphragms for causing operation of said switches in response to vacuum pressure applied to said actuator by said rotor; conductors in said circuit board connected to the terminals of said electrical switches and electric resistors for energizing said blower motors and selectively varying the blower speed; a control assembly remotely located from said switching assembly for manual operation by an occupant of the automobile and connected to said rotor by push-pull wire means for pivotally positioning said rotor and thus selectively interconnecting said ports, channels, vacuum source and actuators to control the temperature and quantity of air into the passenger compartment.

4. In an automatic temperature control system for heating and cooling an automobile passenger compartment of the type having vacuum operated motors for positioning air doors and a variable speed electric motor driven blower for passing air through heating and cooling means, a vacuum and electrical switching assembly comprising: a plurality of flat plates extending parallel to one another and fastened together to form a multilayer member; channels in said plates and between adjacent plates which form vacuum pressure transmitting passages therebetween; a source of vacuum pressure connected to said channels; a rotary type vacuum switch including a disc shaped rotor with an end surface adapted to engage and be rotated against a surface of said multilayered member; said disc shaped rotor formed from a cylindrical metal base with elastomeric material molded on its end surface in the form of semi-annular channels for transmitting vacuum pressure as said rotor is pivoted against the surface of said multilayered member; ports in said multilayered member extending between said channels and said end surface of said multilayered member; vacuum actuators formed on said multilayered member by annular walls extending normal to its surface and covered by flexible diaphragms which with the annular walls define an enclosure; ports in said multilayered member extending between said actuator enclosures and said rotor end surface for conveying vacuum pressure thereto in response to rotation of said rotor; an electrical circuit board supported parallel to said multilayered member and spaced therefrom including a plurality of electrical switches with portions adjacent said actuator diaphragms for causing operation of said switches in response to vacuum pressure applied to said actuator by said rotor; conductors in said circuit board connected to the terminals of said electrical switches and electric resistors for energizing said blower motor and selectively varying the blower speed; a control assembly remotely located from said switching assembly for manual operation by an occupant of the automobile and connected to said rotor by push-pull wire means for pivotally positioning said rotor and thus selectively interconnecting said ports, channels, vacuum source and actuators to control the temperature and quantity of air into the passenger compartment.

* * * * *